United States Patent [19]
Rothermel

[11] Patent Number: 6,007,046
[45] Date of Patent: Dec. 28, 1999

[54] FLUID TRANSPORT CIRCUIT AND VALVE STRUCTURE THEREFOR

[75] Inventor: William F. Rothermel, Miramar, Fla.

[73] Assignee: Coulter International Corp., Miami, Fla.

[21] Appl. No.: 08/990,861

[22] Filed: Dec. 15, 1997

[51] Int. Cl.⁶ .................................................. F16K 31/06
[52] U.S. Cl. ...................................... 251/129.17; 137/606
[58] Field of Search ........................... 137/606; 251/61.1, 251/129.17

[56] References Cited

U.S. PATENT DOCUMENTS

| | | |
|---|---|---|
| 4,304,257 | 12/1981 | Webster . |
| 4,944,487 | 7/1990 | Holtermann ........................ 251/129.17 |
| 5,083,742 | 1/1992 | Wylie et al. . |
| 5,176,359 | 1/1993 | Leveson et al. . |
| 5,203,368 | 4/1993 | Barstow et al. . |
| 5,316,034 | 5/1994 | Farnsworth et al. ................. 137/606 X |
| 5,496,009 | 3/1996 | Farrell et al. . |

*Primary Examiner*—Stephen M. Hepperle
*Attorney, Agent, or Firm*—Warren W. Kurz

[57] ABSTRACT

An open/close valve construction for use in solid-state fluid transport circuits having discrete fluid passageways formed in rigid substrates with a substrate land between port regions of the fluid passageways. The valve construction comprises a diaphragm disk having a dome portion overlying the substrate land and port regions and having a self-restoring resilience sufficient to maintain its dome configuration against substantial line vacuum. A valve actuator is located above the dome portion and spring biased to compress the dome into a flat configuration closing the port regions. Means for negating the spring force are provided to allow the dome portion to restore its configuration and open the valve.

13 Claims, 4 Drawing Sheets

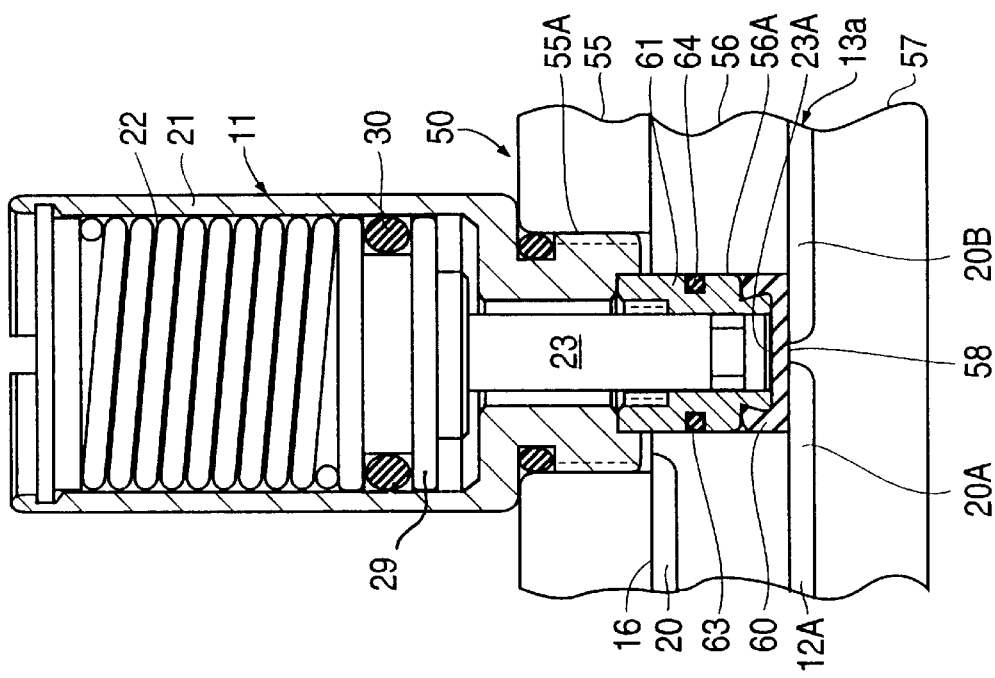
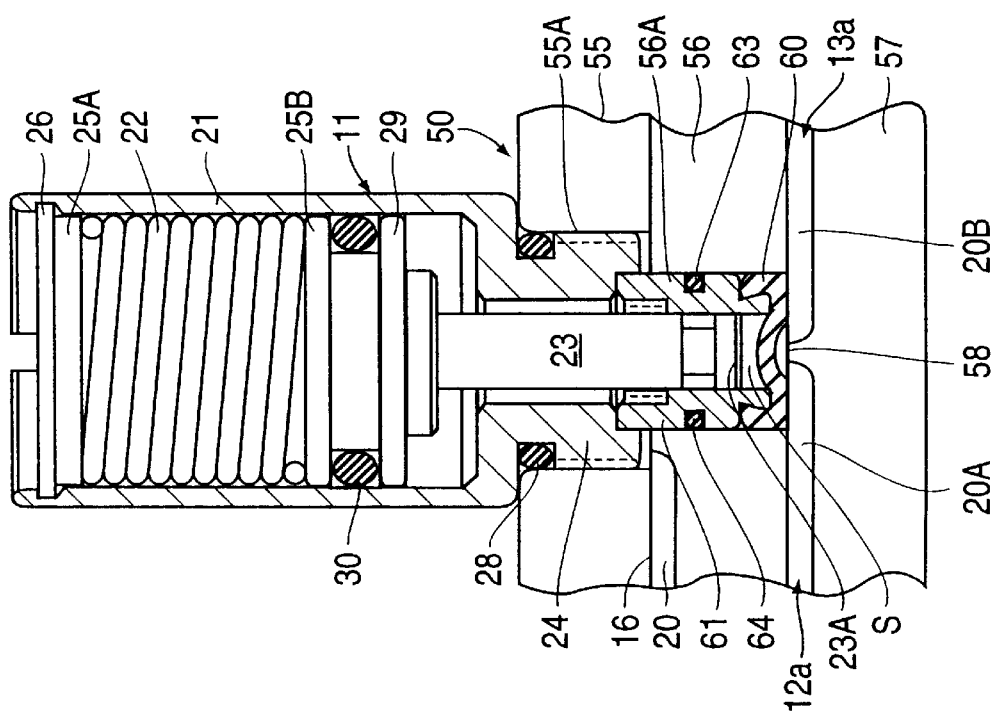

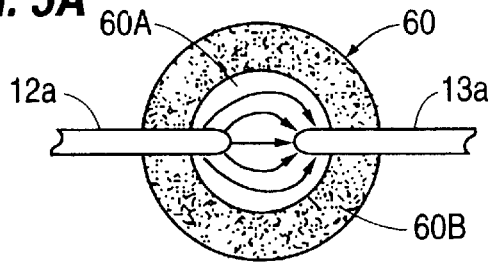
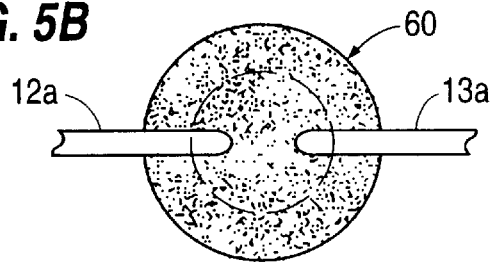
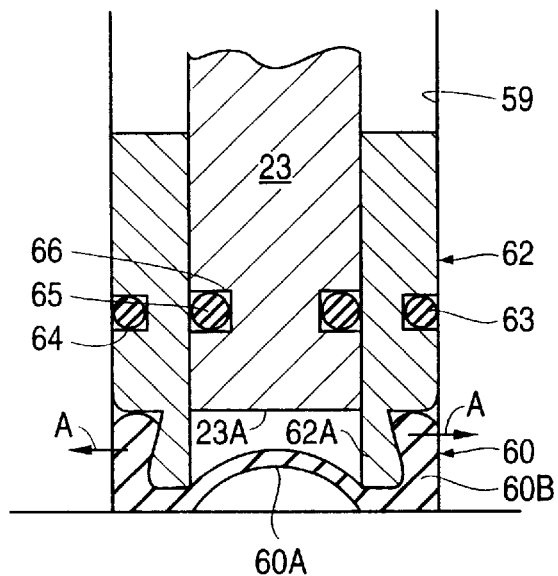
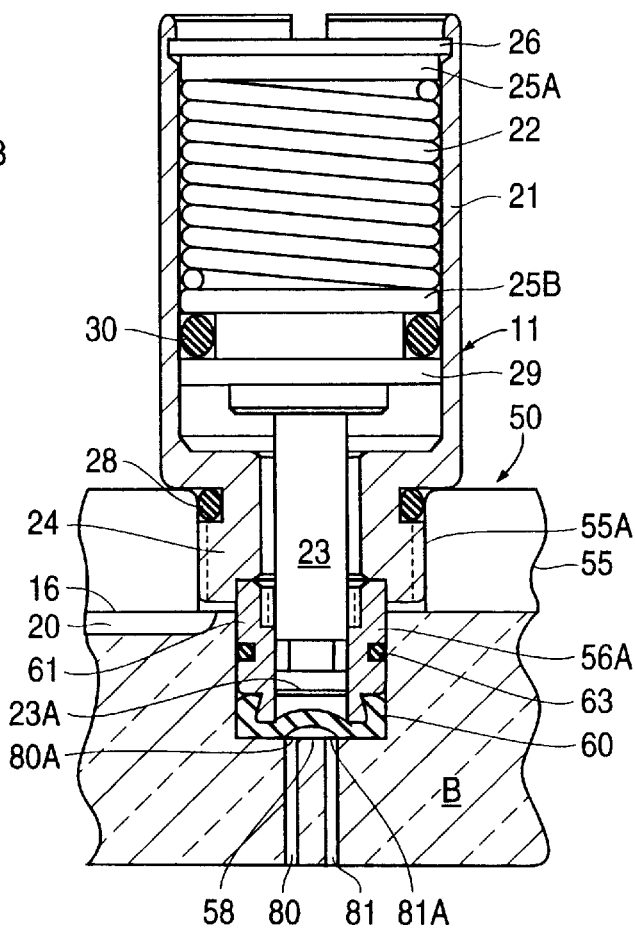

FLUID TRANSPORT CIRCUIT AND VALVE STRUCTURE THEREFOR

BACKGROUND OF THE INVENTION

1. Field of the Invention

The present invention relates to improvements in solid-state fluid circuit systems for effecting controlled transport of liquids and/or gas substances. More particularly, it relates to improved valve structures for selectively providing fluid communication between spaced fluid passageways within such circuit systems.

2. Background Art

In applications where it is necessary to transport and process small quantities of liquid or gas substances in a highly controlled and precise manner, such as in biological liquid analyzers or gas chromatography systems, solid-state fluid circuit systems are gaining in popularity. Such solid-state fluid circuit systems typically comprise a solid plastic plate, usually comprising a laminated structure of two or more plastic plates, having a network of internal passageways for conducting pressurized fluid from one location to another. Various fluid-control devices, i.e. valves, and fluid sensors are located along such passageways to control the movement of the fluid between the passageways and to process the fluid as required. A key component to the effectiveness of any such fluid circuit system is the valving mechanism used to selectively provide a fluid communication between the spaced passageways.

A common approach for constructing valving mechanisms for fluid circuit systems of the above type has been to position a continuous membrane sheet atop a rigid substrate having a planar surface which has been milled-out, chemically etched or otherwise grooved, to define spaced fluid passageways, and to provide means for selectively moving portions of that membrane towards and away from a land portion separating the opposing passageways to respectively prevent and enable fluid communication between the passageways. U.S. Pat. No. 4,304,257 discloses such a valving structure wherein solenoid-operated actuators are affixed to selected portions of such a membrane sheet to mechanically move their respective attached sheet portions towards and away from the land separating spaced passageways. U.S. Pat. No. 5,203,368 discloses a similar valve structure wherein the membrane is pneumatically moved by suction or pressure applied to the side of a continuous sheet membrane that is opposite the fluid flow passageways. U.S. Pat. Nos. 5,083,742 and 5,176,359 disclose a valve mechanism similar to the aforementioned mechanisms, but wherein the membrane sheet is constructed to have a plurality of blister portions that form domes over the lands between spaced fluid passageways. These blister portions have self-restoring forces that normally urge them into their domed condition. Pneumatic actuators are provided for introducing a pressurized fluid into a chamber above each dome in order to flatten the dome into contact with the land between the spaced passageways and thereby disrupt fluid communication between the spaced fluid passageways.

While all of the above-noted valving structures are useful for controlling fluid flow in solid-state fluid circuits of the type described, all suffer significant problems with respect to fluid leakage. This is mainly due to the difficulty in bonding the dissimilar materials that constitute the flexible membrane and the sandwiching or underlying rigid substrates. Such leakage can allow escape of the transported fluid and/or unintended movement of valve elements, due to decreased "holding" pressure on the membrane portions at the open/close region.

U.S. Pat. No. 5,496,009 discloses an approach for avoiding the above-noted leakage problems. Rather than using a single flexible membrane that encompasses the entire surface area of a pair of confronting plates that cooperate to define a network of fluid passageways along which multiple valves are positioned, this approach uses a plurality of discrete flexible diaphragm disks. Each diaphragm disk is positioned within one of a plurality of small valve chambers formed in one of the plates, each valve chamber containing a pair of spaced fluid ports which, by virtue of the valve structure, are to be selectively fluidically connected. The peripheral edge of each disk is sandwiched between the confronting plates to hold the disk in a position overlying the ports. A control port is provided through one plate to access that side of the diaphragm that is opposite the fluid ports, and the diaphragm is moved towards and away from the fluid ports, to respectively close and open fluid communication therebetween, by application of positive or negative pressure to the control port. Since the surface area of each disk is only slightly larger than the respective surface area of the valve chambers, the disks themselves do not significantly interfere with the lamination process of bonding the plates together; thus, the aforementioned leaking of fluid is minimized. While this device is improved significantly with respect to inter-substrate leakage, it is disadvantageous in that it relies upon a pneumatic pressure differential to control movement of a flexible diaphragm member; this presents a problem in maintaining the valve closed over an extended period against positive pressure fluids in the transport passage. Affixing a mechanical actuator to such a thin compliant member would present bonding/attachment difficulties and would be contrary to the patentee's design approach, which is to provide a flexibly conforming seal construction at the diaphragm/flow passage interface. Further, there is still an opportunity for fluid to leak past the edges of the diaphragm disk and into the control port used to deflect the diaphragm disk.

SUMMARY OF THE INVENTION

In view of the foregoing discussion, an object of the present invention is to provide an improved valve construction for solid-state fluid circuit systems of the above type, a valve construction which positively effects valve opening and closing conditions while avoiding the above-noted leakage problems associated with prior art devices.

According to a preferred embodiment, the present invention comprises a valving apparatus for controlling the flow of fluid between the first and second fluid passageways formed in a plate member, such passageways having substantially coplanar portions which are spaced apart by a land portion formed in the plate member. The valving apparatus comprises: (i) a flexible valving element having a resilient, normally dome-shaped portion, (ii) means for supporting the valving element in a position overlying the land portion, so that the dome-shaped portion defines a chamber which spans the distance between such first and second passageways and normally provides fluid communication therebetween, and (iii) a valve actuator having a movable member which is selectively movable between a first position in which it deflects the dome-shaped portion of the valving element into engagement with such land portion and thereby interrupts fluid flow between the passageways, and a second position sufficiently spaced from the dome-shaped portion of the valving element to enable shape-restoring forces in the valving element to restore the dome shape of the dome-shaped portion and thereby enable fluid flow between the passageways. Preferably, the valve actuator comprises a solenoid-operated piston member, and the flexible valving element comprises a disk-shaped diaphragm member having (a) a resilient wall portion which forms the aforementioned dome portion and (b) a rim portion arranged about the perimeter of the dome-shaped portion for sealingly engaging the wall of a valve chamber in which the valving element and actuator are located, whereby fluid in the passageways is prevented from leaking into such chamber. It is also preferred that an insert member be provided for applying radial forces to the rim portion of the diaphragm member to enhance fluid seal between the rim portion and the chamber wall.

The invention will be better understood from the ensuing detailed description of preferred embodiments, reference being made to the accompanying drawings.

BRIEF DESCRIPTION OF THE DRAWINGS

The subsequent descriptions of preferred embodiments refers to the accompanying drawings wherein:

FIGS. 2A and 2B are enlarged cross-sectional views of one of the valve assemblies shown in FIG. 1, showing the valve in open and closed positions, respectively;

FIG. 4 is an enlarged cross-sectional view of the diaphragm element of the FIG. 1–3 valve assembly;

FIGS. 5A and 5B are top illustrations of a valving member in open and closed states, respectively; and FIG. 6 illustrates a portion of a different type of solid-state fluid circuit system embodying the valve structure of the invention.

DETAILED DESCRIPTION OF PREFERRED EMBODIMENTS

Figure 1:
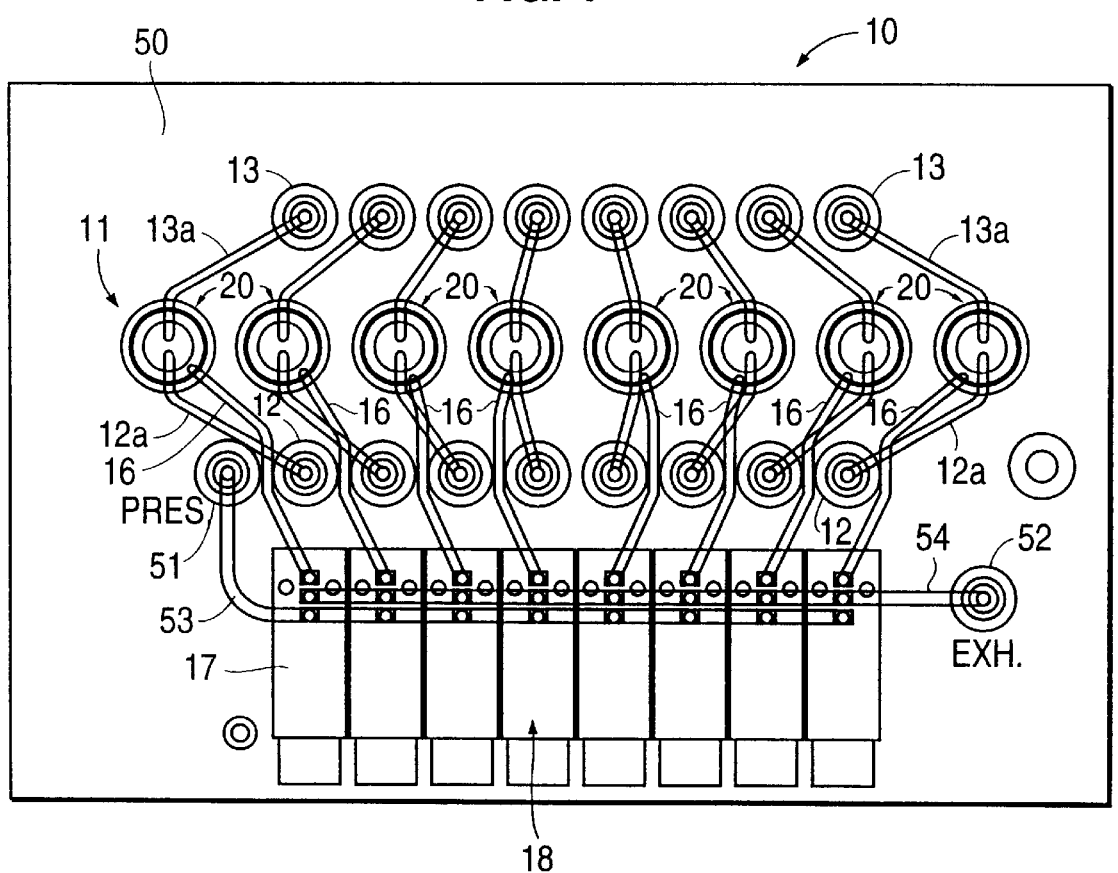
FIG. 1 is a schematic top view of a solid-state fluid circuit system embodying the present invention.

FIG. 1 schematically illustrates a solid-state fluid circuit system 10 useful in fluid handling systems and incorporating eight valve assemblies 11, all of which are structured in accordance with a preferred embodiment of the present invention. In general, each valve assembly 11 is located between its respective inlet port 12 and outlet port 13 and coupled thereto by fluid inlet and outlet passageways 12a, 13a, respectively, which are formed within a plastic fluid transport block or plate 50. Each valve assembly is also coupled by a valve control passageway 16 to one of a plurality of manifold gating elements 17 comprising a pressure control manifold array 18. Preferably, manifold array 18 is mounted on plate 50 and has manifold inlet 51 which is connectable to an external source of air pressure, and an exhaust port 52 through which air in the manifold can escape. Suitable passageway 53, 54 in the plate transport the pressurized air to each of the gating elements. Each gating element is electronically controlled, in a known manner, to selectively apply pressurized air, via passageway 16, to control the opening and closing of its associated valve assembly 11.

Further detail of the valve assembly 11 and the cooperative structure of fluid transport plate 50 can be seen in FIGS. 2A and 2B wherein the valving structure is shown in open and closed positions, respectively. As shown, the fluid transport plate is comprised of three rigid substrate layers 55, 56, 57, formed, e.g., of clear plastic, such as acrylic or PVC material. Layers 55, 56, 57 are suitably bonded to form a laminate construction. The top and intermediate substrates 55, 56 have cylindrical bores 55A, 56A, respectively, formed to receive respective portions of the valve assembly 11. The intermediate layer 56 has a groove 20 formed in its top surface, such groove cooperating with the bottom planar surface of layer 55 to define the valve control passageway 16. Similarly, the top surface of the bottom laminate layer 57 is provided with grooved portions 20A and 20B which, together with the bottom planar surface of intermediate later 56, define co-planar fluid passageways 12a and 12b which are physically spaced apart by an intermediate land portion 58 separating the egress and ingress ports of those passageways.

Figure 3:
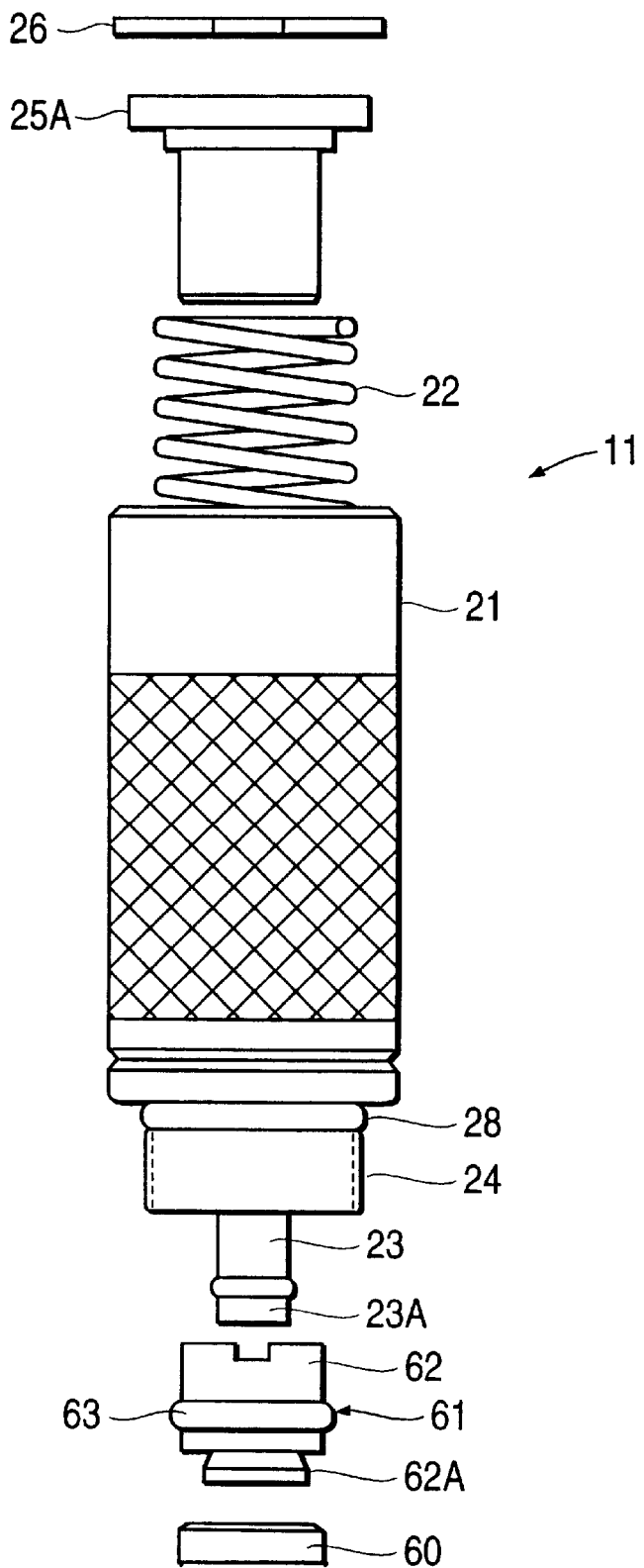
FIG. 3 is an exploded view showing components of the valve assembly shown in FIGS. 2A and 2B.

Referring additionally to FIG. 3, each valve assembly 11 comprises a cylindrical main housing portion 21, which houses a compression spring 22 and a piston member 23. Housing portion 21 includes a lower end portion 24 of reduced diameter and sized to fit snugly within the bore 58 of top substrate 55. An O-ring 28 serves to prevent internal pressurized air, used to actuate the valve (as discussed below), from leaking from the assembly. Spring 22 is contained between top and bottom supports 25A and 25B, respectively, and a retaining ring 26 holds the assembly in place within housing 21. Bottom support 25B is formed in the body of piston 23 and is spaced from the top surface of a piston plate 29 by a compressible O-ring 30. The latter serves as a seal to prevent air flow and to actuate the solenoid from leaking upwards into the space between the walls of the housing 21 and the internal piston. If the solenoid is electrically activated, rather than pneumatically activated, such a seal would, of course, be unnecessary.

Located at the bottom of bore hole 56A is a disk-shaped diaphragm member 60 which is used to control the fluid communication between fluid passageways 12a and 13a. Referring additionally to FIG. 4, diaphragm member 60 has a centrally located domed portion 60A and a circular rim portion 60B extending about the periphery of member 60. The domed portion is located directly over the land 58 separating the fluid passageways 12a and 13a and spans the ingress and egress openings of such passageways. The diaphragm member is made of a flexible material so as to be able to change in shape from (a) that shown in FIG. 2A, in which the domed portion assumes its normal concave/convex shape, to (b) that shown in FIG. 2B, in which the domed portion has been flattened atop the upper surface of the bottom laminate plate 57. Normally, the base 23A of piston 23 is urged by compression spring 22 to a position in which it contacts and flattens the domed portion of member 60, thereby closing off fluid communication between the fluid passageways 12a and 13a. Thus, in the absence of any control signal applied to the valve, the valve is normally in an OFF condition, shown in FIG. 5B, closing off fluid communication between the spaced passageways. In response to a control signal applied through passageway 16, spring 22 is compressed, thereby raising the piston member to a position spaced from the top of dome 60A, as shown in FIG. 2A, in which case the valve is in an ON condition, and fluid flow is enabled between the passageways, over the top of land 58 and under the dome. This condition is illustrated in FIG. 5A.

Referring to FIG. 4, the unique configuration of diaphragm disk 60, in accord with the invention, can be seen in more detail. The disk 60 can be molded from an elastomer, such as chemically-resistant silicone rubber. In one preferred embodiment, the disk 60 is formed of 40 durometer silicone rubber and has an overall diameter of 0.250 inches. In this embodiment, rim portion 60B has a width of about 0.070 inches and a thickness of about 0.040 inches, and dome portion 60A has a uniform thickness of about 0.025 inches. Alternatively, the respective centers of curvature of the concave/convex surfaces that define the dome vary so as to define a dome having a wall thickness that gradually decreases toward the center, for example, from a thickness of about 0.025 inches at the periphery, to about from 0.015 at the center. The preferred construction yields good sealing compliance when the dome is compressed over land 58 and adjacent egress and ingress port regions of grooves 12a and 13a, but also provides excellent self restoring resilience to reassume its dome configuration. If desired, higher durometer elastomer, e.g., 60 durometer can be used. These embodiments provide not only the capability of reliable restoring force opening, but also are of sufficient resilient strength to maintain an open condition against a relatively strong vacuum in the circuit lines, e.g., 25 to 30 inches of mercury.

To assure that pressurized fluid in passageways 12a and 12b does not leak past the edges of diaphragm 60 and into the valve chamber defined by bore 59, a special insert member 61 is provided. Referring to FIGS. 2A, 2B and 3, insert member 61 is in the form of a plastic or metal sleeve 62 that surrounds the end of piston 23 and is press-fit into bore 59. Sleeve 62 terminates in a circular flange 62A that is adapted to engage the rim portion 60B of the diaphragm member 60 and to exert radial forces thereon (in the direction of the arrows A) which cause the rim portion to sealingly engage the cylindrical wall of the valve chamber (bore 59). Preferably, insert member 61 is made of brass. An O-ring 63 is positioned in a circumferential groove 64 in the outer surface of the insert member to further prevent any leakage of fluid into the valve chamber. An O-ring 65 is positioned in a groove 66 formed in the outer surface of piston 23, near its base 23A, to prevent any fluid leakage flow on top of dome 60A.

Referring back to FIGS. 1, 2A and 2B, in operation, the valve assembly is preferably employed in a normally closed (OFF) condition with the piston 23 urged downwardly by spring 22 to compress dome region 60A to a flat condition across land 58 and egress and ingress port regions of passageways 12a and 13a. The spring force is desirably sufficient to maintain this closed condition of the piston and compressed diaphragm dome against line pressures of 30 psi, plus the restoring force of the diaphragm dome. To open the valve assembly 11, its related gating element 17, of control manifold array 18, is actuated to allow positive pressure to enter through control line 16 into the interior of housing 21, below the sealed piston plate 29. The air pressure is of sufficient magnitude, when acting on the lower surface area of the piston plate, to move the piston upwardly, thereby further compressing spring 22. When the piston base 23A has been moved out of contact with the top of the diaphragm dome 60A, thereby providing a space S above the dome, restoring forces in the dome operate to restore its dome shape over the land 58 and ingress, egress port regions of passageways 12a, 13a, allowing fluid flow between those passageways, within the confines of the concave dome region. This provides the valve open condition, and when it is desired to return to the valve closed condition, the gate 17 is operated to vent line 16 to atmosphere through exhaust terminal 52, thus allowing spring 22 to return piston 23 to the down position, again compressing dome 60A of diaphragm 60. One skilled in the art will appreciate that an electrical solenoid member can be utilized, instead of pneumatic pressure, to move the piston upwardly against spring 22.

In fabrication, plastic for substrates 55, 56, 57 are selected for durability, impact resistance, desired transparency or opacity, and for their suitability (e.g., inertness) with respect to chemical compositions and fluid temperatures that will be handled, as well as their inter-bonding characteristics. Acrylic, PVC and polycarbonate plastic materials are useful. Depending on the plastic materials selected, different solvents are used to polish grooves that are milled into the substrate surfaces and to bond the substrates with air-impervious interfaces. Annealing is provided at appropriate stages of the fabrication to relieve mechanically and chemically caused stresses in the substrates, which might cause leakages. The valve assemblies and other components are then mounted onto the fluid transport block and the block is ready for incorporation into a desired use system, e.g., a blood testing apparatus.

FIG. 6 illustrates a portion of a solid-state fluid control circuit in which two fluid passageways 80,81 formed in a solid block B terminate in coplanar ports 80A, 81A, which are spaced apart by a land 83. The valving structure described above, including diaphragm member 60, can be used to control fluid flow between the ports.

The present invention has been described with respect to preferred embodiments, but it will be understood that variations and modifications can be effected within the spirit and scope of the invention.

What is claimed is:

1. In a fluid circuit system of the kind including a pair of rigid substrates having opposed surfaces that cooperatively form discrete fluid passages with respective port regions separated by a substrate wall portion; an improved valve construction comprising:

(a) a cylindrically-shaped valve chamber formed in one of said substrates around said port regions, said chamber having a predetermined diameter;

(b) a discrete diaphragm member mounted within said chamber and having a resilient wall portion normally defining an axially symmetric convex dome adapted to be positioned over said port regions and said substrate wall portion while fluid is flowing between said fluid passages, said dome being surrounded by a circular rim portion having an outer diameter substantially equal to said predetermined diameter of said valve chamber;

(c) valve actuator means, mounted on the opposite side of said dome from said port regions, and having a piston member that is axially movable between (i) a first position in which said piston member contacts and flattens said dome against said substrate wall portion to thereby interrupt fluid flow between said fluid passages and (ii) a second position in which said piston member is sufficiently spaced from said dome to enable restoring forces in said resilient wall portion to cause said dome to self-restore to its convex shape and thereby enable fluid flow between said passages; and (d) means operatively connected to said piston member for exerting radial forces on said rim portion to enhance a fluid seal between said rim portion and said valve chamber.

2. The invention defined in claim 1 wherein said valve actuator means comprises spring means for urging said piston member towards said first position and release means for selectively negating said spring means to enable said piston member to move to said second position.

3. The invention defined in claim 2 wherein said release means comprises means for providing positive pressure to urge said piston member towards its second position.

4. The invention defined in claim 2 wherein said release means comprises solenoid means for moving said piston member towards said second position.

5. The invention defined in claim 1 wherein said dome has restoring forces sufficient to maintain a convex shape when subjected to a vacuum of 25 inches of mercury in said passages.

6. The invention defined by claim 1 wherein said means for exerting radial forces comprises a cylindrical insert having a flange portion which is adapted to engage said rim portion.

7. Valving apparatus for controlling the flow of fluid between first and second fluid passageways formed in a plate member, said passageways having substantially coplanar portions which are spaced apart by a land region formed in said plate member, said valving apparatus comprising:

(a) a flexible valving element having a resilient, normally domed portion surrounded by a circular rim portion, said rim portion being adapted to form a fluid seal with a cylindrical wall of a valve chamber formed in said plate member;

(b) means for supporting said valving element within said valve chamber in a position overlying said land region, said domed portion defining a fluid chamber which spans the distance between said first and second passageways and normally provides fluid communication between said passageways; and (c) a valve actuator having a movable member which is selectively movable between a first position in which said member deflects the domed portion of said valving element into engagement with said land portion and thereby interrupts fluid flow between passageways, and a second position sufficiently spaced from the domed portion of said valving element to enable shape-restoring forces in said valving element to restore the domed shape of said domed portion and thereby enable fluid flow between said passageways.

8. The apparatus as defined by claim 7 wherein said valve actuator comprises biasing means for normally urging said actuator toward said first position whereby said valve is normally close.

9. The invention defined in claim 7 further comprising release means for moving said actuator against said biasing means to a said second position.

10. The invention defined in claim 7 wherein said release means comprises means for providing positive fluid pressure to said actuator.

11. The invention defined in claim 7 wherein said release means comprises solenoid means.

12. The invention defined by claim 7 wherein means are provided for exerting radial forces on said rim portion to enhance said fluid seal.

13. The invention defined by claim 12 wherein said means for exerting radial forces comprises a cylindrical insert having a flange portion which is adapted to engage said rim portion.

* * * * *